April 22, 1969  G. E. RICKERT  3,439,970
SIGHTING DEVICE
Filed April 5, 1965
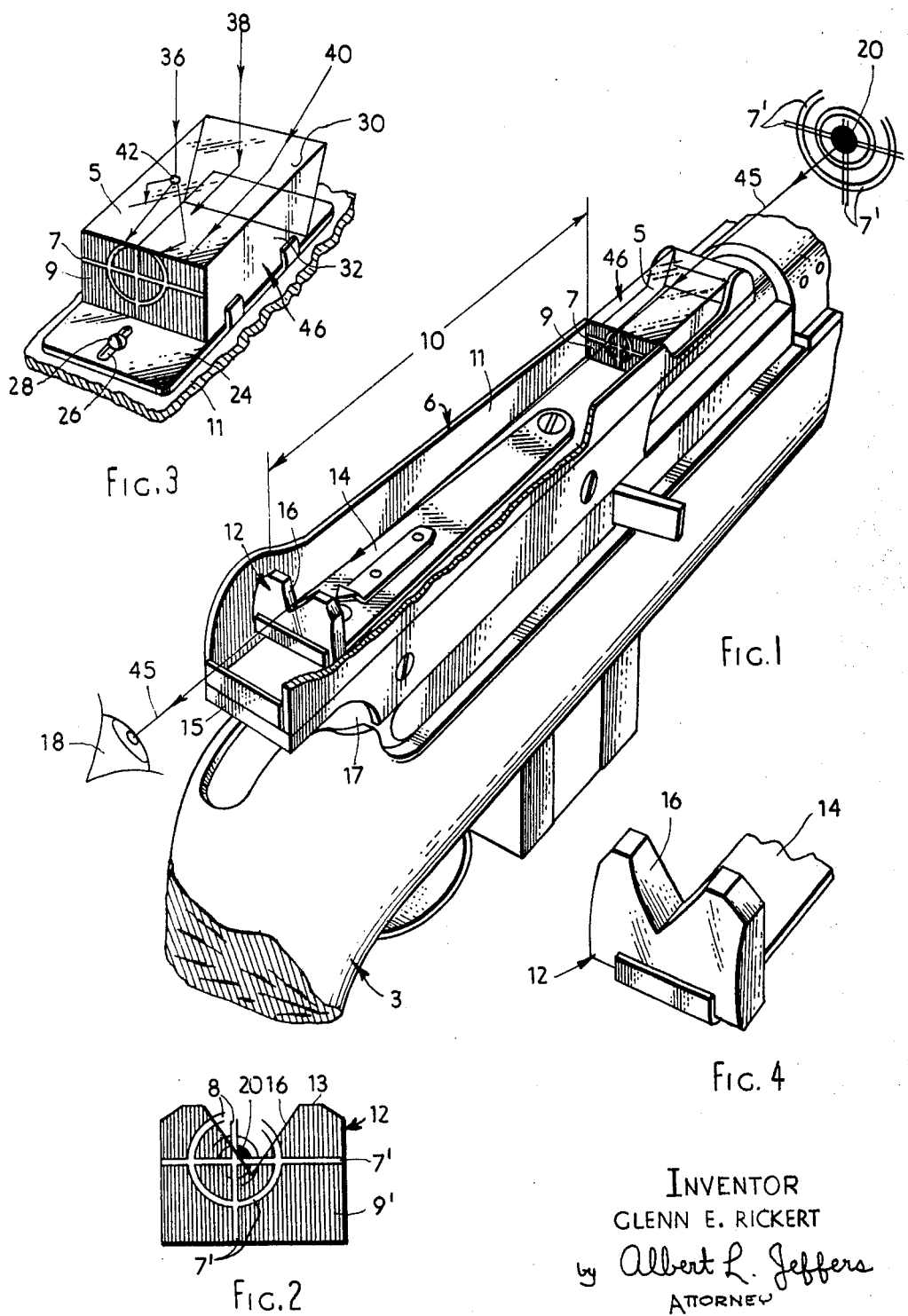
INVENTOR
GLENN E. RICKERT
by Albert L. Jeffers
ATTORNEY United States Patent Office 3,439,970
Patented Apr. 22, 1969

1

3,439,970
SIGHTING DEVICE
Glenn E. Rickert, Community State Bank Bldg.,
Huntington, Ind. 46750
Continuation-in-part of applications Ser. No. 356,403,
Apr. 1, 1964, and Ser. No. 2,701, Jan. 15, 1960.
This application Apr. 5, 1965, Ser. No. 445,574
Int. Cl. G02b 27/32; F41g 1/42
U.S. Cl. 350—10                            5 Claims

ABSTRACT OF THE DISCLOSURE

An optical sighting device is disclosed which includes a rear sighting element consisting of a prismatic collimating lens; and a front sighting element consisting of light transmitting indicia on an otherwise opaque and darkened face. The face is lighted from behind by a fluorescent material which in turn is energized by ambient incident light causing the indicia to appear in a vivid contrasting color to an observer. The front sighting element is placed approximately at the focal point of the rear lens element so that the reticle indicia appears in focus with the target sighted. The prismatic effect of the rear sighting element deviates the rays from the front sighting element to cause them to appear to be coming from the target area although the front sighting element is actually positioned off of the line of sight to the target.

---

This invention relates to optical sights for use on firearms and other equipment requiring accurate sighting.

This application is a continuation-in-part of my copending application, Ser. No. 356,403, entitled "Compact Optical Sight," filed Apr. 1, 1964 which in turn was a continuation-in-part of application Ser. No. 2,701, filed Jan. 15, 1960 and now abandoned.

Heretofore several collimating sights have been presented for use on small arms, each of them have had one or more troublesome characteristic which prevented their being generally acceptable to the trade.

For example, some previous sights, by their basic designs, have seriously reduced the brightness of the target such as to render them inoperative in dim light. Some prior art sights do not have sighting elements of sufficient brightness or discernability to be effective for hunters or combat forces under the dim lighting and adverse background conditions with which they are frequently confronted.

The primary object of this invention is to provide, a sighting element having indicia which when illuminated only by incident light, is highly discernable in either bright or dim light, and against light or dark backgrounds.

A further object of this invention is to provide a sighting device which has the accuracy of the sharply focused and parallax-free reticle of the telescopic sight but which is more compact, and which has a wider field of view than the telescopic sight.

Another object of the invention is to provide a sighting device which gives simultaneously, precise elevation and windage information without unduly limiting the observer's eye to one exact observation position.

2

An important object of one form of the invention is to provide a practical sighting device which permits the observer while sighting, to employ when desired, the full area of the pupil of his eye to see the target on a line of sight which is unrestricted in brightness so that he may successfully see a more dimly lighted target.

A salient object of the invention is to provide a twilight sighting device which for example is effective in sighting a gray squirrel on a gray tree in a dense woods on a gray day at dusk.

Other objects and advantages will be apparent as the following specifications and drawings are studied, wherein:

FIGURE 1 is a fragmentary perspective view of a rifle provided with the sighting device according to the invention;

FIGURE 2 illustrates the observer's view of the sight indicia along the line of sight;

FIGURE 3 is a perspective view of a modified form of the front sight element; and, FIGURE 4 is a perspective view of the rear sight element with a fragment of its mounting.

Referring now to FIGURE 1 of the drawing, the sight 6 has a frame 11 which is attached to a base 15 which in turn is secured to the receiver 17 of a conventional rifle 3. The dark faced reticle 9 has transparent or translucent lines or indicia 7, and is adapted to be illuminated from the rear by the reticle illuminator 5. It is to be understood that the dark faced reticle includes a colored face which contrasts with the indicia color. For most uses a dull black color is preferred.

A collimating optic 12 having plus focus power and a prismatic or line of sight deviating effect is held in position by an adjustment blade 14 attached to the frame 11 of the sight 6. The lens 12 is positioned essentially at its focal length distance designated by the reference number 10 from the reticle indicia 7 of the reticle 9. The eye 18 of the observer looks through the notch 16 of the lens 12 toward the distant target 20 (substantially at infinity) to see a reticle indicia image 7' at the target 20, parallax-free with the target 20 and in focus with the target 20. The edge of the lens 12 can be made to split the effective pupil area of the eye 18 and as a result the reticle indicia image 7' seen through the lens 12 can be made to actually superimpose on the target 20 which is seen down the line of sight 45 through the notch 16. Reticle indicia image 7' as illustrated in FIGURE 2 is shown extending beyond the edge of the lens 12, and is designated by the reference number 8, which is superimposed on the target 20.

A concave focusing mirror may be substituted for the collimating lens optic 12. Thus the collimation is provided by the concave focus of the mirror and the prismatic or line of sight deviation is achieved by tilting the mirror to deviate the reflected line of sight to the reticle from the line of sight to the target. A fully silvered concave mirror is provided with a notch or hole through which to view the target, and the target may be viewed directly through the semitransparency of a semitransparent mirror, or a notch may be employed with a semitransparent mirror.

Referring to FIGURE 3 the front sight element 46 is shown having an adjustable base 24 which has an elongated adjustment screw slot 26 and locking screw 28.

The locking screw 28 when tightened serves to secure the front sight assembly to the floor portion of the frame 11 of the sight 6. A similar slot (not shown) and locking screw may be provided at the other end of the adjustable base 24. The adjustment system permits a small variation from the distance designated by the reference number 10. This adjustment permits relocating the reticle indicia 7 so that it appears in focus and parallax-free with the target when the target is at other than infinity.

In the preferred form, the illuminator 5 is made of optical material, preferably yellow to red to contrast with the green colors of nature, and which contains colored or fluorescent particles. Surface 32 can be provided with a reflective surface or backing to aid brightness. The angled end 30 reflects, by total internal reflection principles, the overhead incident light ray 38 toward the reticle indicia 7 aiding its illumination, while incident light ray 40 from the general direction of the target passes through the angled end 30 and travels toward the reticle indicia to also aid the illumination. Incident light ray 36 passes into the optical material to strike fluorescent particle 42. Particle 42 fluoresces in all directions but many of the rays are internally reflected by the surfaces of the illuminator 5 to travel toward the indicia 7 for illumination purposes. If desired, the illuminator 5 can contain colored material, or employ colored filters, along with the fluorescent material.

The end 30 (angled or otherwise shaped) should be left uncoated and unshielded, so that the illuminator will receive light from the direction of the target when it is aimed from a cavelike structure.

Referring to FIGURES 1 and 2, the prismatic effect of the plus focus power lens 12 causes an image 7' of the reticle indicia 7 to appear displaced upward from the reticle 9 so that the reticle 9 is not in the way of the line of sight 45 to the target 20.

An alternate method of describing the plus focus power prismatic lens 12 and its elevated parallax-free front sight image is as follows:

The rear sight lens 12 is a plus focus power lens having a notch 16 and the front sight reticle 9 forward of the rear sight lens is positioned at a distance (designated by the reference numeral 10) substantially equal to the focal length of the lens 12 when aiming at an infinity located target. The front sight aiming point (reticle center) is at the elevation of the optical center of the lens 12, and the lowest portion of the notch 16 is above the optical center of the lens and above the highest portion of the front sight reticle 9 so that when the observer's eye 18 looks through the notch 16 on a level line of sight to an infinity located target 20, the front sight reticle 9 is below the line of sight 45 to the target 20. Furthermore, because of the prismatic effect of the edge area of the lens, a front sight indicia image 7' appears above the front sight indicia 7. The indicia image 7' is seen through the edge of the lens 12 in a parallax-free manner with the infinity located target 20, and in focus with the target 20 because the front sight is located forward from the lens at a distance substantially equal to the focal length of the lens 12.

It should be noted in FIGURE 2 that the image 7' of the reticle lines or indicia are shown off of the center of the notch to illustrate the advantage of the parallax-free nature of this sight. When the parallax-free reticle image 9' is alternately sighted high in the notch 16, low in the notch, to one side in the notch or even over the top of the protrusion 13, the sight will still indicate the same precise point of aim. The above description illustrates that the sight is parallax-free and that the observer's eye is not restricted to one precise position in sighting. Thus it is demonstrated that any position from which the reticle lines can be seen is a perfect and accurate sighting position. Furthermore, the horizontal and vertical reticle lines do not need to be seen as intersecting each other. They need to be seen only sufficiently to permit the observer knowing where they would intersect if they were extended.

The apparent intersection point is the precise point of aim, the same as when the intersection point is actually seen.

If desired, a solid bar or continuous piece of optical material can fill the space 10 between the lens 12 and the reticle 9 leaving the rear lens surface the only optical surface exposed to possible dirt or other contamination.

It should be noted that a prismatic collimating lens can be a single unitary lens or can be constructed of two optical pieces separated in space where one piece has a collimating effect and the other piece has a prismatic effect.

Those acquainted with the art will readily understand that the invention herein set forth is not necessarily limited and restricted to the precise and exact details presented and that various changes and modifications may be resorted to without departing from the spirit of my invention. Accordingly, applicant does not desire to be limited to the specific details described herein, primarily for purposes of illustration, but instead desires protection falling within the scope of the appended claims.

Having thus described the various features of the invention, what I claim as new and desire to secure by Letters Patent is:

1. A sighting device comprising a reticle provided with a darkened face at the front side of said face, said reticle face having light transmitting indicia adapted to be illuminated from the rear side of said reticle face, an illuminator positioned at the rear side of said reticle face, said illuminator adapted to receive ambient incident light for use in illuminating said indicia, said illuminator further adapted to illuminate said reticle indicia, means to cause the indicia to appear colored so that the indicia of said reticle is discernible to an observer, collimating means to provide a collimated image of said reticle indicia, and prismatic means to position the image of said reticle indicia somewhat off of the line of sight to said reticle indicia.

2. A sighting device comprising: a reticle provided with a darkened face at the front side of said face, said reticle face having light transmitting indicia adapted to be illuminated from the rear side of said reticle face, an illuminator positioned at the rear side of said reticle face, said illuminator adapted to receive ambient incident light, said illuminator comprising fluorescent means for converting said ambient incident light to fluorescent light, said illuminator further adapted to illuminate said reticle indicia with said fluorescent light so that the indicia of said reticle is discernible to an observer, collimating means to provide a collimated image of said reticle indicia, and line of sight deviating means to position the image of said reticle indicia somewhat off of the line of sight to said reticle indicia.

3. A sighting device comprising: a reticle provided with a darkened face, said reticle face having fluorescent indicia adapted to be illuminated by ambient incident light, said fluorescent indicia adapted to appear colored so that the indicia of said reticle is discernible to an observer, a collimating lens positioned with respect to said reticle so as to provide a collimated image of said reticle indicia, said lens being prismatic to permit said reticle indicia to be positioned somewhat off the line of sight to said reticle indicia, and wherein the point which represents the optical center of said lens and the center of said reticle indicia form a line which is parallel to the line of sight to the target.

4. The method of sighting a gun comprising: illuminating the light passing indicia of a dark-faced reticle from the rear side of the face by the use of incident light, coloring the light of the indicia so the indicia will appear colored to an observer, focusing the indicia to place an image of the indicia substantially in the focal plane of a target, deviating the line of sight to the reticle indicia, and aligning the image of the indicia with the target so that the gun is properly aimed while the face of the reticle does not interfere with the observer's view of the target.

5. The method of claim 4 wherein the step of coloring comprises: converting the incident light to fluorescent light, and directing the fluorescent light toward the indicia.

References Cited

UNITED STATES PATENTS

| | | | |
|---|---|---|---|
| 2,659,665 | 11/1953 | Parsons et al. | |
| 3,121,163 | 2/1964 | Rickert. | |
| 985,181 | 2/1911 | Korrodi | 33—52 |
| 1,145,056 | 7/1915 | Cole | 88—2.3 |
| 1,344,639 | 6/1920 | Kraft | 33—52 |
| 2,181,081 | 11/1939 | Ganaway | 88—2.2 |
| 2,430,469 | 11/1947 | Karnes | 33—52 |
| 2,596,522 | 5/1952 | Bethke | 33—47 |
| 2,610,405 | 9/1952 | Dickinson. | |
| 2,780,130 | 2/1957 | Mauer | 88—2.3 |
| 849,504 | 4/1907 | Schanz | 88—2.3 |
| 889,551 | 6/1908 | Schanz | 88—2.3 |
| 1,678,493 | 7/1928 | Van Alada. | |
| 1,982,058 | 11/1931 | King | 88—47 |
| 2,393,308 | 1/1946 | Brown. | |
| 2,706,335 | 4/1955 | Munsey | 33—47 |
| 2,780,129 | 2/1957 | Wood | 88—2.3 XR |

FOREIGN PATENTS

| | | |
|---|---|---|
| 719,592 | 3/1942 | Germany. |
| 629,606 | 12/1961 | Italy. |
| 17,903 | 3/1902 | Sweden. |
| 299,647 | 4/1914 | Germany. |
| 509,491 | 10/1952 | Belgium. |
| 631,306 | 11/1949 | Great Britain. |
| 659,044 | 7/1934 | Germany. |

DAVID SCHONBERG, *Primary Examiner.*
PAUL R. GILLIAM, *Assistant Examiner.*

U.S. Cl. X.R.

33—50